United States Patent [19]

Hoh

[11] Patent Number: 4,607,852

[45] Date of Patent: Aug. 26, 1986

[54] ACCORDIAN-FOLDED BOOT SHIELD FOR FLEXIBLE SWIVEL CONNECTION

[75] Inventor: Joseph C. Hoh, Naperville, Ill.

[73] Assignee: The United States of America as represented by the United States Department of Energy, Washington, D.C.

[21] Appl. No.: 702,540

[22] Filed: Feb. 19, 1985

[51] Int. Cl.$^4$ .......................... F16J 15/52; F16L 9/06
[52] U.S. Cl. .................. 277/1; 277/212 FB; 74/18; 138/114; 403/51
[58] Field of Search .................. 277/212 FB; 403/50, 403/51, 377; 285/DIG. 4; 74/18, 18.1, 18.2; 138/114

[56] References Cited

U.S. PATENT DOCUMENTS

| | | | |
|---|---|---|---|
| 724,510 | 4/1903 | Schutt | 74/18.1 X |
| 2,123,004 | 7/1938 | Farkas | 74/18 X |
| 2,842,678 | 7/1958 | Silverman . | |
| 3,332,446 | 7/1967 | Mann | 138/114 |
| 3,381,987 | 5/1968 | Husen . | |
| 3,473,575 | 10/1969 | Vogelsang et al. | 138/114 X |
| 3,698,724 | 10/1972 | Blachere et al. | 277/34.3 |
| 3,753,287 | 8/1973 | Ziemek et al. | 285/DIG. 4 X |
| 3,757,280 | 9/1973 | Staschewski | 285/DIG. 4 X |
| 3,831,636 | 8/1974 | Bittner | 138/114 X |
| 3,899,012 | 8/1975 | Sather | 285/DIG. 4 X |
| 3,941,413 | 3/1976 | Johnson et al. . | |
| 4,043,564 | 8/1977 | White | 277/212 FB |
| 4,180,101 | 12/1979 | Weggs | 138/103 |
| 4,427,894 | 1/1984 | Sunsoshi et al. . | |

FOREIGN PATENT DOCUMENTS

| | | | |
|---|---|---|---|
| 693608 | 9/1964 | Canada | 74/18 |
| 1231428 | 4/1960 | France | 277/212 FB |

Primary Examiner—Robert S. Ward
Attorney, Agent, or Firm—Jeanette M. Walder; James W. Weinberger; Judson R. Hightower

[57] ABSTRACT

A flexible swivel boot connector for connecting a first boot shield section to a second boot shield section, both first and second boot sections having openings therethrough, the second boot section having at least two adjacent accordian folds at the end having the opening, the second boot section being positioned through the opening of the first boot section such that a first of the accordian folds is within the first boot section and a second of the accordian folds is outside of the first boot, includes first and second annular discs, the first disc being positioned within and across the first accordian fold, the second disc being positioned within and across the second accordian fold, such that the first boot section is moveably and rigidly connected between the first and second accordian folds of the second boot section.

10 Claims, 2 Drawing Figures

ACCORDIAN-FOLDED BOOT SHIELD FOR FLEXIBLE SWIVEL CONNECTION

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to connections between boot shields for remote manipulators.

A remote manipulator generally consists of a pair of telescoping members supporting a gripper that can be rotated and extended through a wide operating field. The mechanism for actuating the gripper is controlled by an operator. Remote manipulators are commonly used in radioactive hot cells and medical cells where the operator must be shielded from contamination from the materials he is working with. To provide protection from contamination from material leaking out of the hot cell at the locations where the manipulator extends through the hot cell walls, boot shields are provided. Boot shields cover the portion of the manipulator inside of the hot cell and are sealed at the hot cell wall. Boot shields are generally made of an impervious plastic material and are formed as a single piece having dissimilarly sized sections to fit over the telescoping members of the manipulator or are formed of two separate sections which are jointed together, such as by welding.

A major problem with boot shields is the failure rate at the junction between the two sections, whether the shield has been continuously formed or joined. This failure is caused by the stresses imposed when operating the gripper and results in frequent replacement. Shield replacement is costly and time consuming in that the entire hot cell must be shut down. Repair of the joint is generally not feasible due to the nature of the boot material.

Therefore, it is an object of the present invention to provide an improved connection between boot shield sections.

It is another object of the present invention to provide a method and means for joining two boot shield sections which is not so subject to failure due to the stresses of operation.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, apparatus for connecting a first boot shield section to a second boot shield section, both first and second boot sections having openings therethrough, the second boot section having at least two adjacent accordian folds at the end having the opening, the second boot section being positioned through the opening of the first boot section such that a first of the accordian folds is within the first boot section and a second of the accordian folds is outside of the first boot, may comprise first and second annular discs, the first disc being positioned within and across the first accordian fold, the second disc being positioned within and across the second accordian fold, such that the first boot section is moveably and rigidly connected between the first and second accordian folds of the second boot section.

BRIEF DESCRIPTION OF THE DRAWINGS

The present invention is illustrated in the accompanying drawings wherein.

DETAILED DESCRIPTION OF THE INVENTION

Figure 2:
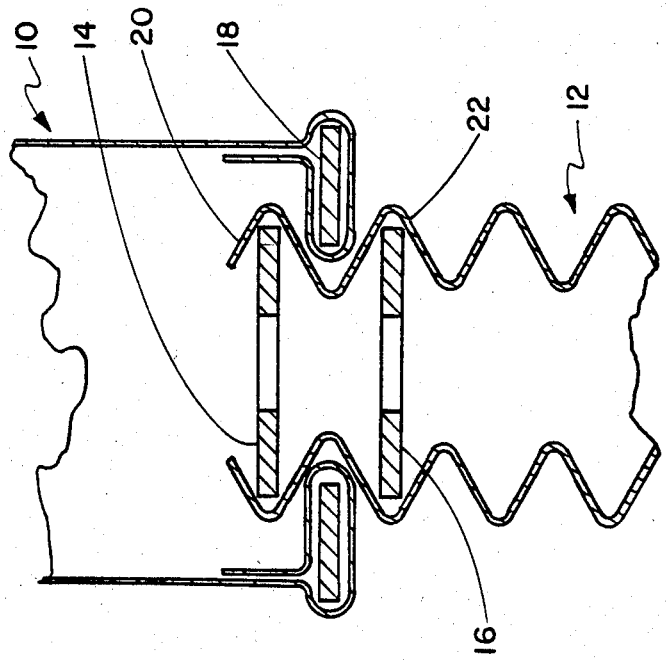
FIG. 2 is a detail cross-section of a connection between two boot shield sections.
Figure 1:
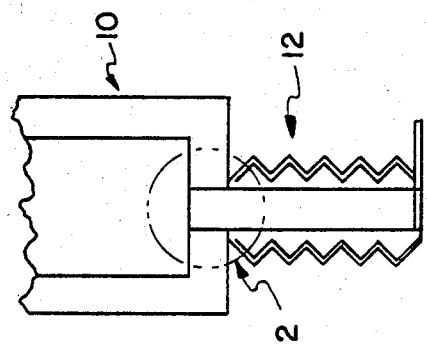
FIG. 1 is a schematic of a remote manipulator with boot shields.

Referring to FIG. 2, boot shield section 10 is joined to boot shield section 12. Both sections have openings for the movement and passage of remove manipulator arms. Boot section 10 is shown as straight walled and cylindrically symmetrical. Boot section 12 is shown as having two accordian folds 20 and 22 at the end having an opening. Additional accordian folds promote ease of axial movement of the extension arm shown in FIG. 1. Boot section 12 is sealed and clamped at the gripper end (not shown in FIG. 2). Both sections 10 and 12 have openings at the point where they are connected; here, this point is where two adjacent accordian folds 20 and 22 are located. Boot section 12 is positioned such that fold 20 is within boot section 10 and fold 22 is outside of boot section 10. When the accordian folds are compressed, they extend over and cover the opening in boot section 10. Annular discs 14 and 16 are positioned within and accross folds 20 and 22 respectively. The annular discs are sized so that they fit firmly in the pleat of each fold. When discs 14 and 16 are so positioned, they compress the accordian folds against boot section 10 forming a moveable and rigid connection. Annular discs 14 and 16 provide a swivel connection between boot sections 10 and 12 in that section 12 may be rotated with movement of the gripper about its axis. A relatively air tight seal can be obtained by inflating the space between the boots and the hot cell wall to a pressure greater than in the hot cell. In this way, hot contaminants are not drawn into the space between the boot and the manipulator.

Since many boot shields are formed of a flexible plastic material, it is necessary to provide a rigid support or some means to strengthen the wall of boot section 10. In FIG. 2, third annular disc 18 is provided to strengthen boot section 10. Disc 18 is shown also compressed between the outside of folds 20 and 22. Disc 18 is shown as welded or heat sealed to boot section 10. Typically, boot sections 10 and 12 are formed of a material of the order of 12 mil in thickness and discs 14, 16, and 18 are formed of a rigid material having a thickness of the order of 60 mil.

The foregoing invention provides a flexible swivel joint betwen boot shield sections. It extends the useful life of new boot shields and can also be used to repair old boot shields.

The embodiments of this invention in which an exclusive property or privilige is claimed are defined as follows:

What is claimed is:

1. Apparatus for connecting a first boot section to a second boot section, said first and second boots having openings therethrough, said second boot having at least two adjacent accordian folds at the end having the opening, said second boot being positioned through the opening of said first boot such that a first of said accordian folds is within said first boot and a second of said accordian folds is outside of said first boot comprising:
first and second annular discs, said first disc being positioned within and across said first accordian fold, said second disc being positioned within and across said second accordian fold such that said first boot is moveably and rigidly connected between said first and second accordian folds.

2. The apparatus of claim 1 further comprising a third annular disc positioned at the opening of said first boot and between and outside of said first and second accordian folds.

3. The apparatus of claim 2 wherein said third annular disc is sealingly connected to said first boot.

4. The apparatus of claim 1 wherein said first and second boots are comprised of a flexible material.

5. The apparatus of claim 1 wherein said first and second boots are cylindrically symmetrical.

6. The apparatus of claim 2 wherein said boot material is a flexible material having a thickness of the order of 12 mil. and said disc material is a rigid material having a thickness of the order of 60 mil.

7. In combination, a first boot shield for covering a remote manipulator, a second boot shield for covering a remote manipulator, and means for connecting said first boot to said second boot, said first and second boots having openings therethrough, said second boot having at least two adjacent accordian folds at the end having the opening, said second boot being positioned through the opening of said first boot such that a first of said accordian folds is within said first boot and a second of said accordian folds is outside of said first boot, said connecting means comprising first and second annular discs, said first disc being positioned within and across said first accordian fold, said second disc being positioned within and across said second accordian fold such that said first boot is moveably and rigidly connected between said first and second accordian folds.

8. The combination of claim 7 further comprising a third annular disc positioned at the opening of said first boot and between and outside of said first and second accordian folds.

9. A method of connecting a first boot shield to a second boot shield, said first and second boot shields having openings therethrough, said second boot shield having at least two adjacent accordian folds at the end having the opening, comprising the steps of:
(a) positioning said second boot shield through the opening of said first boot shield such that a first of said accordian folds is within said first boot and a second of said accordian folds is outside of said first boot shield;
(b) positioning first and second annular discs within and across said first and second accordian folds respectively such that said first boot is moveably and rigidly connected between said first and second accordian folds.

10. The method of claim 9 further comprising the step of positioning a third annular disc at the opening of said first boot shield, between and outside of said first and second accordian folds.

* * * * *